United States Patent [19]

Yeung et al.

[11] Patent Number: 5,387,641
[45] Date of Patent: Feb. 7, 1995

[54] AQUEOUS POLYMER EMULSIONS USEFUL AS WALLCOVERING PREPASTE ADHESIVES

[76] Inventors: Dominic W. K. Yeung, 3661 Golden Orchard Drive, Mississauga, Ontario, Canada, L4Y 3J2; Richard E. Rice, 1333 Bloor Street E., Apt. 1108, Mississauga, Ontario, Canada, L4Y 3T6; Dipak Lad, 64 Metcak Drive, Brampton, Ontario, Canada, L6C 4N4

[21] Appl. No.: 66,792

[22] Filed: May 25, 1993

[51] Int. Cl.$^6$ .................... C08F 2/22; C08L 29/04
[52] U.S. Cl. .................... 524/557; 525/56; 525/243; 525/244; 525/283
[58] Field of Search ........... 524/557, 745; 525/244, 525/56, 203, 243, 283, 255, 261; 526/264, 330, 225, 193

[56] References Cited

U.S. PATENT DOCUMENTS

| | | | |
|---|---|---|---|
| 2,667,473 | 1/1954 | Morner et al. | 260/85.7 |
| 3,166,525 | 1/1965 | Perry et al. | 260/29.6 |
| 3,345,320 | 10/1967 | Uffner et al. | 524/548 |
| 3,462,342 | 8/1969 | Cooper et al. | 524/522 |
| 3,691,125 | 9/1972 | Barabas et al. | 260/29.6 |
| 3,696,065 | 10/1972 | Hoffman et al. | 260/17.4 |
| 3,852,231 | 12/1974 | Heubschmann et al. | 524/592 |
| 4,244,845 | 1/1981 | Woo et al. | 260/17 |
| 4,251,400 | 2/1981 | Columbus | 260/8 |
| 4,325,851 | 4/1982 | Colon et al. | 524/83 |
| 4,520,179 | 5/1985 | Barabas | 526/216 |
| 4,551,512 | 11/1985 | Straub et al. | 526/264 |
| 4,719,264 | 1/1988 | Lotz, Jr. | 525/203 |
| 4,741,790 | 5/1988 | Hawe et al. | 156/71 |
| 4,745,140 | 5/1988 | Goswami | 523/334 |
| 4,806,609 | 2/1989 | Tracy et al. | 526/264 |
| 4,822,676 | 4/1989 | Mudge | 428/343 |
| 5,015,708 | 5/1991 | Shih et al. | 526/264 |
| 5,021,526 | 6/1991 | Ball | 526/240 |
| 5,122,582 | 6/1992 | Potthoff-Karl et al. | 526/81 |
| 5,132,417 | 7/1992 | Potthoff-Karl et al. | 526/264 |

FOREIGN PATENT DOCUMENTS 1304185  5/1989  Canada .

OTHER PUBLICATIONS

*Encyclopedia of Polymer Science and Engineering*, vol. 17, p. 418 (1989).
JP 74015629B (abstract)–Feb. 2, 1970.
Polymers of N–Vinylpyrrolidone: Synthesis, Characterization and Uses by: F. Haaf, A. Sanner, and F. Straub, Polymer Journal, vol. 17, No. 1 pp. 143-152 (1985).

*Primary Examiner*—James J. Seidleck
*Assistant Examiner*—W. Robinson H. Clark
*Attorney, Agent, or Firm*—Andrew M. Solomon

[57] ABSTRACT

A stable aqueous emulsion comprising:
(1) between about 20 and about 50% weight percent synthetic polymer solids, said solids comprising a copolymer or a terpolymer derived from:
  (a) between about 60 and about 90 mole percent of a vinyl ester, optionally including vinyl alcohol derived from said vinyl ester;
  (b) between about 10 and about 40 mole percent of one or more water soluble monomers; and
  (c) between about 0 and about 10 mole percent of an alkyl acrylate or alkyl methacrylate wherein alkyl represents an alkyl group containing between 1 and 20 carbon atoms;
(2) between about 0.5 and about 5.0 weight percent of one or more surfactants or protective colloids; and
(3) the balance water;

wherein said aqueous emulsion has a viscosity of less than 1000 cps at 25° C. and wherein said emulsion can provide adhesive properties and a process for producing the emulsion is provided. The emulsion is particularly suited for use as a wallpaper prepaste adhesive.

20 Claims, No Drawings

AQUEOUS POLYMER EMULSIONS USEFUL AS WALLCOVERING PREPASTE ADHESIVES

BACKGROUND OF THE INVENTION

1. Field of the Invention

The present invention relates to novel aqueous polymer emulsions which are preferably partially or fully hydrolyzed and are particularly suited as wallcovering prepaste adhesives. More specifically, the invention comprises forming an aqueous emulsion of a vinyl ester with an amount of one or more water soluble monomers to yield a product which has adhesive properties. Particularly preferred emulsions have a viscosity of less than 1000 centipoises.

2. Technology Description

A number of materials have been proposed for wallcovering paste materials, and particularly for wallpaper prepaste adhesives. A wallpaper prepaste adhesive is a material which is applied to one side of the wallpaper substrate and then is dried on the substrate. To adhere the paper to a wall, the substrate side with the prepaste adhesive, or more commonly, the entire wallpaper sheet is moistened, typically with water, to cause the adhesive material to swell. The adhesive side is applied to the surface to be covered. An alternative method of applying wallpaper to a surface is to use a "brush on" adhesive which is applied to an uncoated surface of the paper just prior to application of the paper to the wall. While both methods for applying wallpaper to a wall are used, the wallpaper prepaste method is far more common.

Known prepaste adhesives for wallcoverings include starch based materials, modified cellulose materials, alkaline-soluble oil-in-water (O/W) emulsion materials and crosslinked acrylamide-sodium acrylate materials in a water-in-oil (W/O) emulsion. In selecting a prepaste adhesives, the material selected should possess the following attributes: can be applied in one pass, is environmentally safe, is cost effective, is easy to handle, is non-toxic, demonstrates good paste properties and is compatible with commercially available coating machines. Despite the success of the above materials, none can satisfy all of the above criteria A representative example of a starch based adhesives is described in U.S. Pat. No. 3,696,065. Starch adhesives are typically applied to wallcoverings in either powder or aqueous form. These materials can be environmentally deleterious so they can produce dust upon application to the substrate and when applying the covering to a surface. Further, starch based adhesives are not necessarily heat stable and as such are limited in their use. For example, they cannot be used in applications which involve hot embossing procedures. U.S. Pat. No. 3,696,065 specifically discloses the addition of a small amount of a vinylpyrrolidone/vinyl acetate solid copolymer to the starch to improve its adhesiveness.

A representative example of a modified cellulose based adhesive is described in U.K Published Application No. 2,054,628. Modified cellulose adhesives are typically applied to wallcoverings in either powder or aqueous form. These materials can be environmentally deleterious as they can produce dust upon application to the substrate and when applying the covering to a surface. Further, modified cellulose based adhesives are not necessarily heat stable and as such are limited in their use. For example, they cannot be used in applications which involve hot embossing procedures. These materials often do not provide as much adhesion as desired.

A representative example of an alkaline-soluble oil-in-water emulsion type adhesive is described in U.S. Pat. No. 4,741,790. To produce a wallcovering having one side coated with the prepaste adhesive, a two pass coating technique is used. In a first pass, an ionic material which is acidic in nature is coated onto a substrate. Thereafter, in a second pass a layer of base, typically $Na_2CO_3$ is coated over the initial coating to neutralize the acid present in the ionic material. This method, while practiced commercially, suffers in that it requires two precise coating passes to yield a satisfactory final product. This can prove to be both cumbersome and costly.

A representative example of a cross-linked acrylamide-sodium acrylate polymer material in a water in oil emulsion is described in Canadian Patent No. 1,304,185. The adhesive polymeric materials are coated onto a substrate in a mineral spirit solvent. While such materials have gained wide commercial acceptance, they contain an organic solvent, which causes the volatile organic content (VOC) of the resulting emulsion to be higher than ideally desired. As such, these organic solvent-based materials are subject to environmental scrutiny.

Hybrids of the above-described prepaste adhesives have been proposed. For example, U.S. Pat. No. 4,719,264 teaches an adhesive composition made from a blend of an aqueous emulsion of a polymer of vinyl acetate, an organic solvent solution of a copolymer of vinyl acetate and vinyl pyrrolidone having dextrin dispersed therein and an aqueous emulsion of an ester gum tackifier. Such materials still face because of the VOC issue. Further, the starch present in these materials can cause the above-described heat stability problem. Accordingly, these may not be ideal candidates for prepaste adhesives.

Copolymers and blends of homopolymers of vinyl acetate with one or more monomers are known for a variety of uses. For example, U.S. Pat. No. 3,345,320 discloses a solid vinyl pyrrolidone/vinyl acetate copolymer which, when combined with a plasticizer, is useful as a hot melt adhesive. U.S. Pat. No. 5,122,582 discloses the use of a clear aqueous solution containing a copolymer of N-vinyl pyrrolidone and vinyl acetate which is useful as a hair setting lotion or gel. The article "Polymers of N-Vinylpyrrolidone: Synthesis, Characterization and Uses", *Polymer Journal*, Vol. 17, No. 1, pp. 143–152 (1985), suggests that copolymers of N-vinylpyrrolidone can be used as adhesive sticks and as re-moistenable adhesives. The article fails to disclose the use of such copolymers in aqueous emulsion form.

U.S. Pat. Nos. 3,166,525 and 3,691,125 disclose aqueous emulsions of copolymers of vinyl acetate with N-vinyl pyrrolidone prepared in the absence of an emulsifier or protective colloid. U.S. Pat. No. 3,166,525 suggests a number of uses for the emulsions, or the copolymers recovered after removal of water including textile and other finishes, anti-snag finishes for hosiery, sizings for cloths and fibers and as adhesive base materials for paper, plastics, metals, ceramics and the like. According to the examples, the viscosity of the emulsions produced are extremely high (80,000 cps). As a result, the emulsions could not be used as wallpaper prepaste adhesives as it would be impossible to use them with commercial coaters.

U.S. Pat. No. 3,691,125 produces the above copolymers in emulsion form and uses an amount of a poly-N-vinyl lactam, preferably poly vinylpyrrolidone as a seed material. According to the examples, the viscosity obtained when producing a copolymer of vinyl acetate and N-vinyl pyrrolidone ranges from about 13,200 to about 14,700 cps (Example 1) and about 4060 cps (Example 2). These emulsions could not be used as a wallpaper prepaste adhesive as it would be impossible to use them with commercial coaters.

U.S. Pat. No. 4,251,400 discloses adhesives based upon polyvinyl acetate. More specifically, the adhesive comprises an emulsion blend of polyvinyl acetate, polyvinylpyrrolidone and a plasticizer. The adhesive is suggested for use by children as it can easily be removed from clothing. This product cannot swell in water, and as such, is not useful as a prepaste.

Despite the above, there still exists a need in the art for an environmentally safe aqueous emulsion which can be used as a wallcovering prepaste adhesive.

SUMMARY OF THE INVENTION

In accordance with the present invention, novel aqueous emulsion(s) having a low viscosity and adhesive properties are provided. The emulsions primarily function as adhesives, and more specifically, as wallcovering prepaste adhesives. Also provided are the process for preparing the novel emulsions, a wallcovering having at least one side coated with the emulsion to render it adherable to a surface, and the process for preparing the wallcovering. Finally, the present invention provides additional novel emulsions which may be used as wallcovering prepaste adhesives or as brush on pastes.

One embodiment of the present invention comprises a stable aqueous emulsion comprising:
(1) between about 20 and about 50 weight percent synthetic polymer solids, said solids comprising a copolymer or a terpolymer delved from:
   (a) between about 60 and about 90 mole percent of a vinyl ester, optionally including vinyl alcohol derived from said vinyl ester;
   (b) between about 10 and about 40 mole percent of one or more water soluble monomers; and
   (c) between about 0 and about 10 mole percent of an alkyl acrylate or alkyl methacrylate wherein alkyl represents an alkyl group containing between 1 and 20 carbon atoms;
(2) between about 0.5 and about 5.0 weight percent of one or more surfactants or protective colloids; and
(3) the balance water;
wherein said aqueous emulsion has a viscosity of less than 1000 cps at 25° C. and wherein said emulsion can provide adhesive properties.

In particularly preferred embodiments, the polymer is partially or fully hydrolyzed and the solids before hydrolysis are either a copolymer of vinyl acetate and vinyl pyrrolidone, a terpolymer of vinyl acetate, vinyl pyrrolidone and acrylamide or a terpolymer of vinyl acetate, vinyl pyrrolidone and ethyl acrylate. Further, to yield a superior product, the polymer solids may be crosslinked. A preferred use of the aqueous emulsion is as a wallcovering adhesive, and particularly a wallpaper prepaste adhesive. In the preferred hydrolyzed embodiments (i.e., co-or terpolymer), the emulsions are extremely heat stable; a property which is required in wallpaper manufacturing (e.g. heat embossing procedures and expandable processing for polyvinylchloride expandable wallpapers.)

Another embodiment of the present invention comprises the process for producing the above emulsion by copolymerizing the monomers of (a) and (b) in an aqueous medium having a polymer solids content by weight of about 20 to 50 percent and containing between about 0.5 and about 5.0 weight percent of one or more surfactants or protective colloids.

Still another embodiment of the present invention comprises a wallcovering material comprising a substrate having a water remoistenable adhesive on at least one of its surfaces, said adhesive being derived from the above defined stable aqueous emulsion.

In preferred embodiments, the wallcovering material may take the form of strippable wallpaper, vinyl wallpaper, peelable wallpaper, foil wallpaper, cloth fabric and silk, with strippable wallpaper and vinyl wallpaper being particularly preferred.

Another embodiment of the present invention comprises producing a wallcovering comprising a substrate having a water remoistenable adhesive on at least one of its surfaces comprising the steps of applying the above defined aqueous emulsion onto at least one surface of a substrate and then drying the emulsion on the surface.

In preferred embodiments, application of the emulsion to the surface may take place by means of a Myer rod, gravure roller, reverse roller, Flexo-coater, an Air Knife coater or a rotary screen.

Accordingly, it is an object of the present invention to provide novel aqueous stable emulsions having adhesive properties which can be applied onto a substrate in one pass, are environmentally safe, are cost effective, are easy to handle, are non-toxic, demonstrate good paste properties and are compatible with commercially available coating machines.

It is a further object of the present invention to provide a process for producing the novel stable aqueous emulsions.

An additional object of the present invention is to provide a wallcovering material having at least one surface coated with the above aqueous emulsion and which may be easily applied to a surface by wetting the emulsion and applying the wallcovering material to the surface.

Still another object of the present invention is to provide a process for producing the wallcovering material These and other objects will be readily apparent to those skilled in the art its reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The present invention comprises an aqueous emulsion containing between about 20 and about 50 percent polymer solids of a copolymer or terpolymer formed between a vinyl ester, one or more water soluble monomers and, optionally, an alkyl acrylate or alkyl methacrylate. As will be discussed in greater detail, the solids may be partially or fully hydrolyzed such that some or all of the vinyl ester is converted to vinyl alcohol. In particularly preferred embodiments, the level of polymer solids in the emulsion ranges from about 20 to about 35 percent. In addition, the emulsion should preferably have a viscosity of below 1000 cps at 25° C. as measured by a Brookfield Viscometer (spindle #3, 60 rpm) and should provide adhesive properties.

The vinyl ester, which comprises between about 60 and about 90 mole percent of the copolymer or terpolymer, is preferably vinyl acetate. However, other higher homologs of vinyl acetate may be selected such as vinyl 2-ethylhexanoate, vinyl propionate, vinyl pivalate, vinyl neononanoate and vinyl neodecanoate. The vinyl ester is preferably present in amounts ranging from about 70 to about 80 mole percent and even more preferably between about 70 and 75 mole percent or between about 75 and about 80 mole percent of the formed polymer.

The other monomer(s) used to form the copolymer or terpolymer is one or more water soluble monomers which combines with the vinyl ester to yield the polymer solids of the emulsion. Examples of water soluble monomers which may be copolymerized with vinyl esters, and particularly vinyl acetate include vinyl pyrrolidone, acrylic and sodium acrylate, itaconic acid and sodium methylene succinate (sodium salt of itaconic acid), methacrylic acid and sodium methacrylate, 1-allyloxy-2-hydroxypropyl sulfonic acid and sodium 1-allyloxy-2-hydroxypropyl sulfonate, 2-acrylamido-2-methylpropyl sulfonic acid and sodium 2-acrylamido-2-methylpropyl sulfonate, diacetoneacrylamide, N-vinyl formamide, dimethacrylamide and acrylamide. Mixtures of the above monomers may also be selected. Other water soluble monomers which may be selected will be appreciated by those skilled in the art.

The water soluble monomers comprise 10 to 40 mole percent of the polymer formed. Particularly preferred water soluble monomers include vinyl pyrrolidone and acrylamide. When using vinyl pyrrolidone, it should be preferably present in amounts ranging from 20 to 40 mole percent of the polymer, more preferably between 20 and 39 mole percent of the polymer. When combined with vinyl acetate to form a copolymer, the molar amount preferably ranges from between about 25 to about 30 mole percent. When combined with vinyl acetate and another monomer, such as acrylamide or an alkyl acrylate such as ethyl acrylate to form a terpolymer, the amount of vinyl pyrrolidone preferably ranges from about 25 to about 30 mole percent.

While acrylamide may be present in amounts ranging from 0.1 to 40 mole percent and may form a copolymer with a vinyl ester such as vinyl acetate, it is particularly preferred that acrylamide be used in amounts ranging from about 0.1 to about 10 mole percent and in combination with vinyl pyrrolidone and vinyl acetate to form a terpolymer. Although believed to be novel, emulsions containing copolymers of vinyl acetate and acrylamide having more than 10 mole percent of acrylamide tend to have very high viscosities. While these materials may be useful as "brush on" adhesives, they are not ideal candidates as prepaste adhesives. Even more preferred amounts of acrylamide when used to form a terpolymer range from about 1 to about 5 mole percent.

While not as thoroughly tested, it is further hypothesized that a vinyl acetate/N-vinyl formamide copolymer may yield a particularly desirable emulsion for use as a wallpaper prepaste adhesive. In such use, the amount of vinyl acetate is preferably between about 60 and 70 mole percent and the amount of N-vinyl formamide is preferably between about 30 and 40 mole percent.

In another embodiment, a terpolymer derived from a vinyl ester, one or more water soluble monomers and up to 10 percent of an alkyl acrylate or alkyl methacrylate, wherein alkyl represents an alkyl group containing between 1 and 20 carbon atoms is provided. Examples of alkyl acrylates and methacrylates include ethyl acrylate, butyl acrylate, methyl methacrylate, methyl acrylate, ethylhexylacrylate, hydroxyethylacrylate, hydroxyethylmethacrylate, hydroxypropylacrylate, hydroxypropylmethacrylate, stearyl methacrylate and lauryl methacrylate. Particularly preferred is a terpolymer of vinyl acetate, vinyl pyrrolidone and any of the above alkyl acrylates or methacrylates. In this embodiment the amount of vinyl pyrrolidone preferably ranges from about 25 to about 30 percent, and the amount of alkyl acrylate or methacrylate, such as ethyl acrylate, ranges from about 0.1 to about 10 percent, and even more preferred between about 1 and about 5 percent.

To enable the novel emulsions to be more heat stable, it is desired that they be partially or fully hydrolyzed so that part or all of the vinyl ester is converted to vinyl alcohol, with partial hydrolysis being especially preferred. Hydrolysis may be accomplished by adding either acid or base to the emulsion, with a base addition being the preferred route. The degree of hydrolysis can be controlled by the amount of acid or base added. The hydrolysis reaction may be performed at temperatures ranging from 10° to 80° C., with a range of 50° C.–60° C. being preferred. The preferred degree of hydrolysis based upon the amount of vinyl ester present in the polymer solids ranges from about 30 to about 80 percent, with a more preferred range being between about 50 and about 75 percent, and a most preferred range being between about 60 and about 70 percent. It has further been discovered that when hydrolyzing the solids to a level beyond about 80 percent the emulsion inverts, forming a solution which, however, retains its adhesive properties.

Examples of bases which may be used to hydrolyze the emulsion include sodium hydroxide, sodium carbonate, potassium hydroxide, ammonium hydroxide and potassium carbonate, with sodium hydroxide being preferred.

When producing an emulsion having a viscosity of less than 1000 cps at 25° C., more preferably less than 750 cps, even more preferably less than 500 cps and most preferably less than 250 cps it is generally necessary to include one or more surfactants or protective colloids. These materials are present in amounts ranging from about 0.5 to 5 weight percent of the emulsion, with amounts ranging between about 1 to 5 weight percent being more preferred. Examples of suitable surfactants include ammonium lauryl ether sulfate, sodium lauryl ether sulfate, octyl phenol ethoxylates (30–50 moles of ethylene oxide), nonyl phenol ethoxylates (30–50 moles of ethylene oxide), sodium lauryl sulfate, and phosphate esters such as ammonium or sodium salts of poly(oxy-1,2-ethanediyl), α-(nonylphenol)-ω-hydroxy-phosphate, poly(oxy-1,2-ethanediyl), α-phenol-ω-hydroxy-phosphate and poly(oxy-1,2-ethanediyl), α-(octylphenol)-ω-hydroxy-phosphate. These materials are commercially sold by Rhone-Poulenc Inc. under the trade names Abex JKB, Abex VA-50, Abex 23S, Alkasurf NP-40, Rhodasurf RP-710, Sipon LSB, Alkasurf NP-50, Rhodafac R9-25A, Rhodasurf RE-610 and Rhodasurf RE-960.

Mixtures of surfactants may ideally be used. A particularly preferred surfactant blend includes two weight percent ammonium lauryl ether sulfate and one weight percent nonyl phenol ethoxylates (40 moles of ethylene oxide).

Examples of protective colloids which may be selected include poly[vinyl alcohol], hydroxyethyl cellulose, poly[vinyl pyrrolidone], sodium polyacrylate and condensation products of polyethylene glycol with fatty acid, long chain alkylene or polyhydroxy fatty acids. Examples of the condensation products are sold by ICI under the Hypermer name.

The polymer formed in the aqueous emulsion may be crosslinked. This is accomplished by adding between about 0.01 and about 3.0 weight percent of one or more crosslinking agents to the emulsion. Examples of suitable crosslinking agents include ethylene glycol dimethacrylate, pentaerythritol tetracrylate, dipentaerythritol pentacrylate, trimethylolpropane trimethacrylate, pentaerythritol triacrylate, polyethylene glycol diacrylate, divinylbenzene and triallyl isocyanurate, with ethylene glycol dimethacrylate and trimethylolpropane trimethacrylate being particularly preferred. Mixtures of the above crosslinking agents may be used.

Further, the final emulsion may include between about 0.01 and 3.0 weight percent of other additives to improve paste properties such as antifoaming agents, fungicides, paste body enhancers to increase slip and the like. These materials are well known in the art.

To produce the emulsion the surfactant and/or protective colloid is added to water and the solution is heated to between about 50° and about 70° C., more preferably to about 60° C. In a separate vessel, the vinyl ester and water soluble monomers are mixed together along with a crosslinking agent, if desired. Before adding the monomer/crosslinking agent to the water/surfactant solution an amount of a polymerization initiator is added to the water/surfactant solution.

The polymerization initiator may take the form of many known initiators such as azo, peroxide, perester and redox initiators. The amount of initiator added to the solution typically ranges from between about 0.05 to about 2 weight percent of the emulsion with amounts ranging from about 0.1 to about 0.5 weight percent being particularly preferred. The free radical initiator added is preferably an azo (azobisnitrile) type initiator (water or oil soluble) such as 2,2'azobis-(2-methyl-propanenitrile), 2,2'azobis-(2,4-dimethylpentanenitrile), 2,2'-azobis-(2-methylbutanenitrile), 1,1'-azobis(cyclohexanecarbonitrile), 2,2'-azobis-(2,4-dimethyl-4-methoxyvaleronitrile) and 2,2'-azobis-(2-amidinopropane) hydrochloride. Other free radical initiators which may be selected include peroxide materials such as benzoyl peroxide, cumene hydroperoxide, hydrogen peroxide, acetyl peroxide, lauroyl peroxide, and peresters such as t-butylperoxypivalat, α-cumylperoxypivalate and t-butylperoctoate. Examples of commercially suitable initiators which may be selected include Wako V-50, Vazo 52, Vazo 64, Vazo 67 and Lupersol 11. The initiators may be added in an inert solvent such as acetone.

Once a portion of the initiator is added into the water/surfactant solution, the monomer/crosslinking agent mixture is metered into the reactor at between about 50° and about 70° C., and more preferably at about 60° C. In practice, the monomer/crosslinking agent mixture addition can take from 30 minutes to six hours, with addition times between 2 and 4 hours being preferred. Thereafter, a series of initiator additions and "hold" periods wherein the emulsion is maintained at the approximate temperature of the initial water/surfactant mixture for a period of time, for example 2 hours, are conducted until the monomers have fully polymerized. Anywhere from two to seven separate initiator additions may be utilized. Using the above method can convert over 99.5% of the monomers to polymeric form.

Once the emulsion is prepared it may either be used "as is" as a brush on wallcovering adhesive but is more preferably used as a wallcovering prepaste adhesive.

To produce a wallcovering material having a prepaste adhesive on one of its surfaces, the above low viscosity emulsion is coated onto one surface of the substrate and the surface is dried. The substrate typically comprises strippable wallpaper, vinyl wallpaper, peelable wallpaper, foil wallpaper, cloth fabric or silk, with strippable wallpaper and vinyl wallpaper being particularly preferred substrate materials.

Application of the emulsion to the substrate surface can be accomplished by any of the commonly known methods. These include Myer rod, gravure roller, reverse roller, rotary screen, Flexo-coater and Air Knife coater. In practice the coating weight of the emulsion applied to the surface ranges from about 2 to about 30 grams/meter$^2$, preferably ranges from about 5 to about 20 grams/meter$^2$, with a coating weight of from about 8 to about 15 grams/meter$^2$ being particularly preferred. Achieving the desired coating weight can be accomplished in one pass.

After the emulsion has been coated onto the substrate, it is dried, typically by using a commercial paper dryer. Such ovens typically operate at an air temperature between about 70° C. and about 200° C. Thereafter, the substrate, particularly if it is wallpaper may be sent to a printing station where decorative printing is applied to the non-coated surface (alternatively, the paper may be printed prior to coating the prepaste onto the non-printed surface). The wallcovering is then packaged and shipped for customer use.

To use the wallcovering having the adhesive emulsion coated and dried on one surface thereon, the surface containing the adhesive, or more commonly, the entire wallcovering is immersed in water. The water causes the solids in the emulsion coating to swell, yielding a thin adhesive film. The adhesive surface is then applied to the wall or other surface to be treated.

The invention is described in greater detail by the following non-limiting examples.

EXAMPLE 1

The aqueous emulsion of crosslinked vinyl acetate-vinyl pyrrolidone (VA-VP) copolymer is synthesized as follows:

In a 1000 ml reaction flask which is equipped with a dropping funnel, a condenser, an agitator and a nitrogen inlet, is added demineralized water (549.0 g), ammonium lauryl ether sulfate (18.0 g) and ethoxylated (40 moles ethylene oxide) nonylphenol (9.0 g). The emulsifier (surfactant) solution is heated to 60° under a slow nitrogen purging. The nitrogen purging is maintained throughout the reaction. A vinyl acetate (204.1 g, 2.37 moles), vinyl pyrrolidone (65.9 g, 0.59 moles) and ethylene glycol dimethacrylate (0.54 g) monomer mixture is put in a dropping funnel. When the temperature reaches 60° C., azobis-isobutyronitrile AIBN (0.68 g in 2.5 g acetone) is added. Then the monomer mixture is immediately metered in to the reaction flask over two hours. Three equal portions of AIBN (0.68 g each) are added every half-hour during the two hour addition period. The reaction is held at 60° C. for 30 minutes following the mono- The synthesis is repeated with either different types of emulsifiers (surfactants), different monomer molar ratios, or different crosslinking agents. The results are gathered in Table 1.

TABLE 1

| Sample | VA-VP Molar ratio | Emulsifiers (surfactants) (Based on whole mixture) | Crosslinking Agent and Amount (based on monomers) | Emulsion Viscosity (V.#3, 60 rpm 25° C.) | Total % Solids (150° C., 1 hr.) | Emulsion Stability |
|---|---|---|---|---|---|---|
| 1 | 70:30 | Ammonium lauryl ether sulfate 2% Nonylphenol + 40 EO 1% | Ethylene glycol dimethacrylate 0.2% | 3600 cps | 33.5% | stable |
| 2 | 75:25 | Ammonium lauryl ether sulfate 2% Nonylphenol + 40 EO 1% | Ethylene glycol dimethacrylate 0.2% | 760 cps | 34% | stable |
| 3 | 80:20* | Ammonium lauryl ether sulfate 2% Nonylphenol + 40 EO 1% | Ethylene glycol dimethacrylate 0.2% | 240 cps | 34% | stable |
| 4 | 85:15 | Ammonium lauryl ether sulfate 2% Nonylphenol + 40 EO 1% | Ethylene glycol dimethacrylate 0.2% | 120 cps | 32% | stable |
| 5 | 90:10 | Nonylphenol + 40 EO 3% Natrosol Plus 0.3% | Ethylene glycol dimethacrylate 0.2% | 30 cps | 28% | unstable lumps appeared during polymerization |
| 6 | 75:25** | Ammonium lauryl ether sulfate 3% Nonylphenol + 40 EO 1% | Trimethylolpropane trimethacrylate, 0.5% | 460 cps | 30% | stable |
| 7 | 75:25 | Ammonium lauryl ether sulfate 2% Phosphate ester RP710 | Trimethylolpropane trimethacrylate, 0.5% | 840 cps | 33% | stable |
| 8 | 75:25 | Phosphate ester RE-960 3% | Trimethylolpropane trimethacrylate, 0.5% | 620 cps | 30% | stable |
| 9 | 75:25 | Nonylphenol + 40 EO 3% | Ethylene glycol dimethacrylate, 0.2% | 1300 cps | 33% | stable |
| 10 | 75:25 | Ammonium lauryl ether sulfate 2% Nonylphenol + 40 EO 1% Ethyl cellulose 0.1% | Trimethylolpropane trimethacrylate 0.5% | 1100 cps | 30% | stable |
| 11 | 75:25 | Nonylphenol + 40 EO 3% modified hydroxyethyl cellulose 0.25% | Ethylene glycol dimethacrylate 0.2% | 2650 cps | 31% | stable |
| 12 | 80:20 | Ammonium lauryl ether sulfate 2% Nonylphenol + 40 EO 1% | Ethylene glycol dimethyacrylate 0.5% | 280 cps | 33% | stable |
| 13 | 80:20 | Ammonium lauryl ether sulfate 2% Nonylphenol + 40 EO 1% | Ethylene glycol dimethacrylate 1.0% | 280 cps | 30% | stable |
| 14 | 80:20 | Nonylphenol + 40 EO 3% | Ethylene glycol dimethacrylate 0.2% | 390 cps | 33% | stable |
| 15 | 75:25 | Ammonium lauryl ether sulfate 2% Nonylphenol + 40 EO 1% | Ethylene glycol dimethacrylate 0.2% | 1600 cps | 33% | stable |
| 16 | 75:25 | No emulsifier | Ethylene glycol dimethacrylate 1.0% | 4000 cps | 29% | stable |
| 17 | 75:25 | No emulsifier | Trimethylopropane trimethacrylate 0.5% | 2700 cps | 28.4% | stable |
| 18 | 75:25 | Ammonium lauryl ether sulfate 2% Nonylphenol + 40 EO 1% | No Crosslinking | 1200 cps | 34% | stable |
| 19 | 80:20 | Ammonium lauryl ether sulfate 2% Nonylphenol + 40 EO 1% | No Crosslinking | 700 cps | 34% | stable |
| 19 | 80:20 | Ammonium lauryl ether sulfate 2% Nonylphenol + 40 EO 1% | No Crosslinking | 700 cps | 34% | stable |

*The experiment is repeated 22 times. Average viscosity is 270 cps., std. deviation of 76
**The experiment is repeated 24 times. Average viscosity is 487 cps., std. deviation of 110 mers addition. Another portion of AIBN (0.27 g) is added and the reaction is held for another ninety minutes. The reaction is further chased down with another portion of AIBN (0.54 g), and is held for two hours. Then the reaction is cooled down to 25° C., and the mixture was filtered through a 100 micron filtering bag. A homogenous, lump-free, milk-like stable emulsion is obtained. The residual vinyl acetate (HPLC method) is less than 0.5 percent.

EXAMPLE 2

The aqueous emulsion of crosslinked vinyl acetate-vinyl pyrrolidone-acrylamide is prepared as follows:
In a 1000 ml reaction flask equipped with an agitator, a condenser, a dropping funnel and a nitrogen inlet, is added demineralized water (590.1 g), ammonium lauryl ether sulfate (17.9 g), and ethoxylated (40 moles ethylene oxide) nonyl phenol (9.0 g). A monomer mixture consisting of vinyl acetate (187.8 g, 2.18 moles), vinyl pyrrolidone (80.7 g, 0.72 mole), acrylamide (50 percent solution, 10.7 g, 0.075 moles), Versenex 80 (a chelating agent, 0.02 g), and ethylene glycol dimethacrylate (0.54 g) is put in a dropping funnel. The aqueous solution is heated to 60° C. under a slow nitrogen purge (which is maintained throughout the reaction). When the temperature reaches 60° C., AIBN (0.68 g in 2.0 g acetone) is added followed by immediately metering in the monomers solution from the dropping funnel. The addition of monomers occurs over two hours at 60° C. Three equal AIBN portions (0.68 g in 2.0 g acetone) are added every half hour during this two hour addition period. The reaction is held at 60° C. for thirty minutes following the monomers addition. Another AIBN portion (0.28 g in 1.2 g acetone) is added and the reaction is held at 60° C. for ninety minutes. An extra portion of AIBN (0.56 g in 1.6 g acetone) is added and the reaction is held at 60° C. for another two hours. The reaction mixture is cooled down to 25° C., and the emulsion is filtered through a 100 micron filtering bag. A homogeneous, lump-free, milk-like stable emulsion is obtained. The residual vinyl acetate (HPLC method) is less than 0.5 percent.

The synthesis using the above general procedure is repeated either with different molar ratios, different emulsifiers or with different crosslinking agents.

The results are shown in Table II.

TABLE II

| Sample | VA-VP-AM Molar ratio | Emulsifiers (surfactants) (Based on emulsions) | Crosslinking Agent and Amount (based on monomers) | Emulsion Viscosity (LV,#3,60 rpm 25° C.) | Total % Solids (150° C.. 1 hr,) | Emulsion Stability |
|---|---|---|---|---|---|---|
| 20* | 73.1:24.4:2.5 | Ammonium Lauryl ether sulfate 2% Nonyl phenol + 40 EO 1% | Ethylene glycol dimethacrylate, 0.2% | 860 cps (320 cps) | 32.4% (28%) | stable |
| 21 | 74.0:24.7:1.3 | Ammonium Lauryl ether sulfate 2% Nonyt phenol + 40 EO 1% | Ethylene glycol dimethacrylate, 0.2% | 820 cps | 29.3% | stable |
| 22 | 75:15:10 | Ammonium Lauryl ether sulfate 2% Nonyl phenol + 40 EO 1% | Ethylene glycol dimethacrylate, 0.2% | 3200 cps | 30.6% | stable |
| 23 | 73.1:24.4:2.5 | Ammonium Lauryl ether sulfate 2% Nonyl phenol + 40 EO 1% | Pentaerythritol teiracrylate 0.2% | 1500 cps | 31.4% | stable |
| 24 | 73.1:24.4:2.5 | Ammonium Lauryl ether sulfate 2% Nonyl phenol + 40 EO 1% | Dipentaerythritol Pentacrylate 0.296 | 2500 cps | 31.9% | stable |
| 25 | 73.1:24.4:2.5 | Ammonium Lauryl ether sulfate 2% Nonyt phenol + 40 EO 1% | Trimethylolpropane trimethacrylate 0.2% | 1100 cps | 31.5% | stable |
| 26 | 73.1:24.4:2.5 | Ammonium Lauryl ether sulfate 2% Nonyl phenol + 40 EO 1% | Pentaerythritol triacrylate 0.2% | 1500 cps | 31.1% | stable |
| 27 | 73.1:24.4:2.5 | Ammonium Lauryl ether sulfate 2% | Polyethylene glycol diacrylate 0.2% | 1000 cps | 32.7% | stable |
| 28 | 73.1:24.4:2.5 | No emulsifier | Ethylene glycol dimethacrylate | 6000 cps | 30.0% | stable |
| 29 | 73.1:24.4:2.5 | Phosphate ester RE-960 3% | Ethylene glycol dimethacrylate 0.2% | 1340 cps | 34.5% | stable |
| 30 | 73.1:24.4:2.5 | Ammonium Lauryl ether sulfate 2% Phosphate ester RE-960 1% | Ethylene glycol dimethacrylate 0.2% | 1960 cps | 33.8% | stable |
| 31 | 73.1:24.4:2.5 | Poly(vinyl alcohol) Elvanol 51-05 3% | Ethylene glycol dimethacrylate 0.2% | 5100 cps | 30.5% | stable |
| 32 | 73.1:24.4:2.5 | Ammonium Lauryl ether sulfate 2% Poly(vinyl alcohol) Elvanol 51-05 1% | Ethylene glycol dimethacrylate 0.2% | 1320 cps | 30.5% | stable |

*The experiment is repeated more than 22 times. Average viscosity of 28 percent solids is 446 cps, std. deviation of 103.

EXAMPLE 3

Aqueous emulsions of crosslinked polymers of vinyl ester with dimethacrylamide is prepared using basically the same procedure as in Example 1.

The results are shown in Table III.

TABLE III

Results of Crosslinked vinyl ester-dimethacrylamide (DMA) polymers

| Sample | Polymer and Molar ratio | Emulsifiers (Based on emulsions) | Initiator Used | Crosslinking Agent and Amount (based on monomers) | Emulsion Viscosity (LV,#3,60 rpm 25° C.) | Emulsion Stability |
|---|---|---|---|---|---|---|
| 33 | Vinyl acetate - DMA (75:25) | Ammonium lauryl ether sulfate 1% Phosphate ester, RP-710 3% | Lupersol 11 (a parester) | Ethylene glycol dimethacrylate 0.2% | 1800 cps | stable |
| 34 | Vinyl acetate - DMA (75:25) | Ammonium lauryl ether sulfate 1% Phosphate ester, RP-710 3% | Lupersol 11 (a perester) | Ethylene glycol dimethaerylate, 0.5% | 1300 cps | stable |
| 35 | Vinyl acetate - DMA (75:25) | Ammonium lauryl ether sulfate 2% Nonylphenol + 40 EO 1% | AIBN | Ethylene glycol dimethacrylate 0.2% | 8000 cps (33% solids) | stable |
| 36 | Vinyl acetate - DMA (80:20) | Ammonium lauryl ether sulfate 2% Nonylphenol + 40 EO 1% | AIBN | Ethylene glycol dimelhacrylate 0.2% | 1400 cps (32.8% solids) | stable |

TABLE III-continued

Results of Crosslinked vinyl ester-dimethacrylamide (DMA) polymers

| Sample | Polymer and Molar ratio | Emulsifiers (Based on emulsions) | Initiator Used | Crosslinking Agent and Amount (based on monomers) | Emulsion Viscosity (LV,#3,60 rpm 25° C.) | Emulsion Stability |
|---|---|---|---|---|---|---|
| 37 | Vinyl propionate - DMA (75:25) | Ammonium lauryl ether sulfate 2% Nonylphenol + 40 EO 1% | AIBN | Ethylene glycol dimethacrylate 0.25 | 3350 cps (33.2% solids) | stable |
| 33 | Vinyl acetate - DMA (75:25) | Ammonium lauryl ether sulfate 1% Phosphate ester, RP-710 3% | Lupersol 11 (a parester) | Ethylene glycol dimethacrylate 0.2% | 1800 cps | stable |
| 34 | Vinyl acetate - DMA (75:25) | Ammonium lauryl ether sulfate 1% Phosphate ester, RP-710 3% | Lupersol 11 (a parester) | Ethylene glycol dimethacrylate, 0.5% | 1300 cps | stable |
| 35 | Vinyl acetate - DMA (75:25) | Ammonium lauryl ether sulfate 2% Nonylphenol + 40 EO 1% | AIBN | Ethylene glycol dimethacrylate 0.2% | 8000 cps (33% solids) | stable |
| 36 | Vinyl acetate - DMA (80:20) | Ammonium lauryl ether sulfate 2% Nonylphenol + 40 EO 1% | AIBN | Ethylene glycol dimethacrylate 0.2% | 1400 cps (32.8% solids) | stable |
| 37 | Vinyl propionate - DMA (75:25) | Ammonium lauryl ether sulfate 2% Nonylphenol + 40 EO 1% | AIBN | Ethylene glycol dimethacrylate 0.25 | 3350 cps (33.2% solids) | stable |

EXAMPLE 4

The synthesis of crosslinked terpolymers of vinyl acetate-vinyl pyrrolidone-ethyl acrylate are done essentially following the same procedure as in Example 1. The results are shown in Table IV.

TABLE IV

Results of Crosslinked vinyl acetate-vinyl pyrrolidone-ethyl acrylate (VA-VP-EA) terpolymers

| Sample | Terpolymer (VA-VP-EA) Molar ratio | Emulsifiers (surfactants) (based on emulsion) | Crosslinking Agent (based on monomers) | Emulsion Viscosity (LV,#3,60 rpm, 25° C.) | Total % Solids (150° C., 1 hr.) | Emulsion Stability |
|---|---|---|---|---|---|---|
| 38 | 70:25:5 | Nonyl phenol + 40 EO 3% Natrosol Plus 0.25% | Ethylene glycol dimethacrylate 0.2% | 5200 cps | 33.6% | stable |
| 39 | 70:25:5 | Nonyl phenol + 40 EO 3% | Ethylene glycol dimethacrylate 0.2% | 2200 cps | 33.2% | stable |
| 40 | 65:25:10 | Nonyl phenol + 40 EO 3% Natrosol Plus 0.3% | Ethylene glycol dimethacrylate 0.2% | too high for spindle #3,60 rpm | 33% | some lumps found |
| 41 | 55:25:20 | Nonyl phenol + 40 EO 3% | Ethylene glycol dimethacrylate 0.2% | — | — | large lumps |
| 42 | 75:20:5 | Nonyl phenol + 40 EO 3% | Ethylene glycol dimethacrylate 0.2% | 740 cps | 30% | some lumps formed |
| 43 | 70:20:10 | Nonyl phenol + 40 EO 3% | Ethylene glycol dimethacrylate 0.2% | — | — | large lumps |

EXAMPLE 5

The alkaline hydrolysis of many aqueous emulsions of vinyl acetate polymers as synthesized in Examples 1–4 is done as follows:

To an aqueous emulsion (about 33% total solids) of crosslinked vinyl acetatevinyl pyrrolidone copolymer in a flask, is added sodium hydroxide solution with agitation over 20 minutes at room temperature (about 25° C.). Then the mixture is maintained with agitation at room temperature for 18 hours. Stable emulsions are obtained. The viscosity, % solids and pH are measured. The pH can be adjusted with acid to desired specifications. The residual monomer (HPLC) cannot be detected. The results are gathered in Table V.

The hydrolysis is repeated under a variety of conditions (e.g., different degree of hydrolysis, different reaction temperature and time, different aqueous polymer emulsions, different solids contents) with the above general procedure. The results of all these experiments are shown in Table V.

TABLE V

Results of Alkaline Hydrolysis

| Aqueous Emulsion | Experiment Sample | Degree of hydrolysis (based of vinyl acetate) | Temperature and time | Emulsion viscosity after hydrolysis (LV #3,60 rpm 25° C.) | Total % solids (150° C., 1 hour) | Emulsion pH | Emulsion stability |
|---|---|---|---|---|---|---|---|
| Sample 1 | 44 | 10% | 25° C., 18 hrs. | 140 cps | 20.5% | 9.50 | stable |
| Sample 1 | 45 | 30% | 25° C., 18 hrs. | 120 cps | 20.5% | 9.70 | stable |
| Sample 1 | 46 | 65% | 25° C., 18 hrs. | 300 cps | 20.5% | 9.70 | stable |
| Sample 2 | 47 | 10% | 25° C., 18 hrs. | 40 cps | 20.5% | 9.30 | stable |
| Sample 2 | 48 | 30% | 25° C., 18 hrs. | 100 cps | 20.6% | 9.40 | stable |
| Sample 2 | 49 | 50% | 25° C., 18 hrs. | 380 cps | 20.1% | 9.80 | stable |
| Sample 2 | 50 | 65% | 25° C., 18 hrs. | 400 cps | 20.7% | 9.70 | stable |
| Sample 3 | 51 | 10% | 25° C., 18 hrs. | 40 cps | 21.6% | 9.42 | stable |
| Sample 3 | 52 | 30% | 25° C., 18 hrs. | 100 cps | 21.4% | 9.50 | stable |
| Sample 3 | 53 | 50% | 25° C., 18 hrs. | 240 cps | 21.4% | 9.90 | stable |
| Sample 3 | 54 | 50% | 50° C., 2 hrs. | 170 cps | 20.0% | 10.14 | stable |
| Sample 3 | 55 | 50% | 60° C., 2 hrs. | 210 cps | 19.9% | 9.45 | stable |
| Sample 3 | 56 | 50% | 70° C., 2 hrs. | 200 cps | 19.8% | 8.91 | stable |
| Sample 3 | 57 | 50% | 80° C., 2 hrs. | 250 cps | 21.5% | 7.69 | stable |

TABLE V-continued

Results of Alkaline Hydrolysis

| Aqueous Emulsion | Experiment Sample[1] | Degree of hydrolysis (based of vinyl acetate) | Temperature and time | Emulsion viscosity after hydrolysis (LV #3,60 rpm 25° C.) | Total % solids (150° C., 1 hour) | Emulsion pH | Emulsion stability |
|---|---|---|---|---|---|---|---|
| Sample 3 | 58* | 65% | 25° C., 18 hrs. | 220 cps | 20.8% | 9.72 | stable |
| Sample 3 | 59 | 65% | 50° C., 2 hrs. | 280 cps | 20.7% | 10.41 | stable |
| Sample 3 | 60 | 65% | 60° C., 2 hrs. | 210 cps | 19.8% | 9.45 | stable |
| Sample 3 | 61 | 65% | 70° C., 2 hrs. | 200 cps | 18.4% | 9.00 | stable |
| Sample 3 | 62 | 65% | 80° C., 2 hrs. | 500 cps | 19.8% | 8.40 | stable |
| Sample 3 | 63 | 75% | 25° C., 18 hrs. | 700 cps | 21.4% | 10.10 | stable |
| Sample 4 | 64 | 65% | 25° C., 18 hrs. | 250 cps | 20.2% | 9.70 | stable |
| Sample 5 | 65 | 50% | 25° C., 18 hrs. | 110 cps | 18.8% | 8.75 | stable |
| Sample 6 | 66 | 10% | 25° C., 18 hrs. | 40 cps | 18.9% | 9.40 | stable |
| Sample 6 | 67 | 30% | 25° C., 18 hrs. | 120 cps | 18.9% | 9.50 | stable |
| Sample 6 | 68 | 50% | 25° C., 18 hrs. | 300 cps | 19.0% | 10.30 | stable |
| Sample 6 | 69 | 65% | 25° C., 18 hrs. | 250 cps | 19.0% | 10.10 | stable |
| Sample 6 | 70 | 80% | 25° C., 18 hrs. | 320 cps | 18.5% | 10.80 | stable |
| Sample 7 | 71 | 65% | 25° C., 18 hrs. | 400 cps | 20.5% | 10.20 | stable |
| Sample 9 | 72 | 50% | 25° C., 18 hrs. | 410 cps | 20.9% | 8.51 | stable |
| Sample 9 | 73 | 80% | 25° C., 18 hrs. | 320 cps | 19.2% | 8.80 | stable |
| Sample 9 | 74 | 10% | 50° C., 2 hrs. | 50 cps | 18.7% | 7.65 | stable |
| Sample 9 | 75 | 30% | 50° C., 2 hrs. | 190 cps | 19.9% | 8.60 | stable |
| Sample 9 | 76 | 50% | 50° C., 2 hrs. | 410 cps | 21.6% | 9.00 | stable |
| Sample 9 | 77 | 65% | 50° C., 2 hrs. | 620 cps | 22.4% | 9.24 | stable |
| Sample 11 | 78 | 50% | 25° C., 18 hrs. | 750 cps | 20.8% | 8.84 | stable |
| Sample 12 | 79 | 65% | 25° C., 18 hrs. | 160 cps | 20.5% | 10.11 | stable |
| Sample 13 | 80 | 50% | 25° C., 18 hrs. | 180 cps | 20.5% | 10.55 | stable |
| Sample 14 | 81 | 50% | 25° C., 18 hrs. | 260 cps | 20.6% | 9.29 | stable |
| Sample 15 | 82 | 50% | 25° C., 18 hrs. | 260 cps | 19.9% | 10.22 | stable |
| Sample 16 | 83 | 65% | 25° C., 18 hrs. | 840 cps | 19.3% | 9.80 | stable |
| Sample 17 | 84 | 65% | 25° C., 18 hrs. | 1140 cps | 19.2% | 9.11 | stable |
| Sample 18 | 85 | 10% | 25° C., 18 hrs. | 40 cps | 20.0% | 9.40 | stable |
| Sample 18 | 86 | 30% | 25° C., 18 hrs. | 100 cps | 20.2% | 9.40 | stable |
| Sample 18 | 87 | 65% | 25° C., 18 hrs. | 380 cps | 20.2% | 10.00 | stable |
| Sample 19 | 88 | 10% | 25° C., 18 hrs. | 40 cps | 20.5% | 9.60 | stable |
| Sample 19 | 89 | 30% | 25° C., 18 hrs. | 120 cps | 20.7% | 9.50 | stable |
| Sample 19 | 90 | 65% | 25° C., 18 hrs. | 500 cps | 20.8% | 10.00 | stable |
| Sample 20 | 91 | 30% | 25° C., 18 hrs. | 100 cps | 20.3% | 9.70 | stable |
| Sample 20 | 92 | 50% | 25° C., 18 hrs. | 180 cps | 20.0% | 10.00 | stable |
| Sample 20 | 93 | 75% | 25° C., 18 hrs. | 380 cps | 20.2% | 10.33 | stable |
| Sample 35 | 94 | 65% | 25° C., 18 hrs. | 580 cps | 19.2% | 11.66 | phase-separation |
| Sample 36 | 95 | 65% | 25° C., 18 hrs. | 340 cps | 19.3% | 11.32 | phase-separation |
| Sample 37 | 96 | 65% | 25° C., 18 hrs. | 160 cps | 20.4% | 12.60 | slight phase-separation |
| Sample 38 | 97 | 50% | 25° C., 18 hrs. | 1740 cps | 20.8% | 8.74 | stable |
| Sample 39 | 98 | 50% | 25° C., 18 hrs. | 7200 cps | 20.4% | 8.45 | stable |
| Sample 42 | 99 | 50% | 25° C., 18 hrs. | 22750 cps | 22.4% | 8.52 | semi-gelled |

*Experiment is repeated 21 times with these conditions; average viscosity is 220 cps (std. deviation of 28), % solids is 20.7 (std. deviation of 0.2) and pH is 9.75 (std. deviation of 0.3). Emulsions are all stable.

EXAMPLE 6

Lab Evaluation Test

The aqueous polymer emulsions (hydrolyzed and unhydrolyzed) that are prepared are evaluated as pre-pasted wallpaper adhesives by simply performing drawdown onto wallpapers of coat weight ranging about 10 g/m². The coated wallpaper (either strippable or solid vinyl types) is dried at 120° C. for 90 seconds. After soaking the pre-pasted paper in water (about 30° C.) for 10 seconds, the paste properties are examined after booking for 60 seconds. The wallpapers (with paste after soaking) are also tested for adhesion by hanging on a wall (coated with five layers of a flat latex paint). These properties are given a subjective rating of 1 to 5 by a panel of technical experts, with 1 being worst and 5 being best. Results are gathered in Table VI.

As recorded in Table VI, the hydrolyzed polymers give much better paste properties than those of corresponding unhydrolyzed product. Also, better paste properties are achieved with crosslinked polymer than that of non-crosslinked. However, they all gave excellent adhesion on the wall.

TABLE VI

Performance Results of Aqueous Polymer Emulsions

| Sample | Paste Properties (body and feel) | Adhesion (wet and dry) |
|---|---|---|
| 1 | 3 | 5 |
| 2 | 3 | 5 |
| 3 | 2 | 3 |
| 4 | 1 | 1 |
| 5 | 1 | 1 |
| 6 | 3 | 5 |
| 7 | 3 | 5 |
| 8 | 3 | 5 |
| 9 | 3 | 5 |
| 10 | 3 | 5 |
| 11 | 3 | 5 |
| 12 | 2 | 3 |
| 13 | 2 | 3 |
| 14 | 2 | 3 |
| 15 | 3 | 5 |
| 16 | 3 | 5 |
| 17 | 3 | 5 |
| 18 | 3 | 5 |
| 19 | 2 | 3 |

TABLE VI-continued

Performance Results of Aqueous Polymer Emulsions

| Sample | Paste Properties (body and feel) | Adhesion (wet and dry) |
|---|---|---|
| 20 | 3 | 5 |
| 21 | 3 | 5 |
| 22 | 3 | 5 |
| 24 | 3 | 5 |
| 25 | 3 | 5 |
| 26 | 3 | 5 |
| 27 | 3 | 5 |
| 28 | 3 | 5 |
| 29 | 3 | 5 |
| 30 | 3 | 5 |
| 31 | 3 | 5 |
| 32 | 3 | 5 |
| 33 | 3 | 5 |
| 34 | 3 | 5 |
| 35 | 3 | 5 |
| 36 | 3 | 5 |
| 37 | 3 | 5 |
| 38 | 3 | 5 |
| 39 | 3 | 5 |
| 40 | 3 | 5 |
| 42 | 3 | 5 |
| 44 | 3 | 5 |
| 45 | 4 | 5 |
| 46 | 5 | 5 |
| 47 | 3 | 5 |
| 48 | 4 | 5 |
| 49 | 5 | 5 |
| 50 | 5 | 5 |
| 51 | 3 | 5 |
| 52 | 3 | 5 |
| 53 | 4 | 5 |
| 54 | 4 | 5 |
| 55 | 4 | 5 |
| 56 | 4 | 5 |
| 57 | 4 | 5 |
| 58 | 5 | 5 |
| 59 | 5 | 5 |
| 60 | 5 | 5 |
| 61 | 5 | 5 |
| 62 | 5 | 5 |
| 63 | 5 | 5 |
| 64 | 4 | 5 |
| 65 | 3 | 4 |
| 66 | 3 | 5 |
| 67 | 4 | 5 |
| 68 | 5 | 5 |
| 69 | 5 | 5 |
| 70 | 5 | 5 |
| 71 | 5 | 5 |
| 72 | 5 | 5 |
| 73 | 5 | 5 |
| 74 | 3 | 5 |
| 75 | 5 | 5 |
| 76 | 5 | 5 |
| 77 | 5 | 5 |
| 78 | 5 | 5 |
| 79 | 4 | 5 |
| 80 | 4 | 5 |
| 81 | 4 | 5 |
| 82 | 5 | 5 |
| 83 | 5 | 5 |
| 84 | 4 | 5 |
| 85 | 3 | 5 |
| 86 | 4 | 5 |
| 87 | 5 | 5 |
| 88 | 2 | 3 |
| 89 | 4 | 5 |
| 90 | 5 | 5 |
| 91 | 4 | 5 |
| 92 | 5 | 5 |
| 93 | 5 | 5 |
| 94 | 3 | 5 |
| 95 | 3 | 5 |
| 96 | 3 | 5 |
| 97 | 5 | 5 |
| 98 | 5 | 5 |
| 99 | 5 | 5 |

EXAMPLE 7

Heat Stability

The heat stability of the paste is evaluated as follows. The aqueous polymer emulsions are coated onto a piece of wallpaper (either strippable or solid-vinyl) by a simple lab draw-down method with a Myer rod. The coated wallpaper is then dried at 150° C. or at 210° C. for a prescribed time. The paste properties are then examined after soaking in water (30° C.) for 10 seconds and then booking for 1 minute. The paste coated on wallpaper and dried at 120° C. for 90 seconds is used as the standard for comparison.

The results are shown in Table VII.

TABLE VII

Results of Heat Stability

| Sample | 120° C. (90 seconds) | 150° C. (5 minutes) | 210° C. (2 minutes) |
|---|---|---|---|
| 1 | stable | unstable | — |
| 2 | stable | unstable | — |
| 3 | stable | unstable | — |
| 4 | stable | unstable | — |
| 5 | stable | unstable | — |
| 6 | stable | unstable | — |
| 7 | stable | unstable | — |
| 9 | stable | unstable | — |
| 12 | stable | unstable | — |
| 15 | stable | unstable | — |
| 16 | stable | unstable | — |
| 17 | stable | unstable | — |
| 18 | stable | unstable | — |
| 19 | stable | unstable | — |
| 20 | stable | unstable | — |
| 25 | stable | unstable | — |
| 28 | stable | unstable | — |
| 31 | stable | unstable | — |
| 35 | stable | stable | stable |
| 36 | stable | stable | stable |
| 37 | stable | stable | stable |
| 39 | stable | unstable | — |
| 44 | stable | some degraded | unstable |
| 45 | stable | stable | stable |
| 46 | stable | stable | stable |
| 47 | stable | unstable | unstable |
| 48 | stable | stable | some degraded |
| 49 | stable | stable | stable |
| 50 | stable | stable | stable |
| 51 | stable | unstable | unstable |
| 52 | stable | stable | some degraded |
| 53 | stable | stable | stable |
| 54 | stable | stable | stable |
| 55 | stable | stable | stable |
| 56 | stable | stable | stable |
| 57 | stable | stable | stable |
| 58 | stable | stable | stable |
| 59 | stable | stable | stable |
| 60 | stable | stable | stable |
| 61 | stable | stable | stable |
| 62 | stable | stable | stable |
| 63 | stable | stable | stable |
| 64 | stable | stable | stable |
| 65 | stable | stable | stable |
| 66 | stable | unstable | unstable |
| 67 | stable | stable | stable |
| 68 | stable | stable | stable |
| 69 | stable | stable | stable |
| 70 | stable | stable | stable |
| 71 | stable | stable | stable |
| 72 | stable | stable | stable |
| 73 | stable | stable | stable |
| 74 | stable | unstable | unstable |
| 75 | stable | stable | stable |
| 76 | stable | stable | stable |
| 77 | stable | stable | stable |
| 78 | stable | stable | stable |
| 79 | stable | stable | stable |
| 80 | stable | stable | stable |
| 81 | stable | stable | stable |

TABLE VII-continued

| | Results of Heat Stability | | |
|---|---|---|---|
| Sample | 120° C. (90 seconds) | 150° C. (5 minutes) | 210° C. (2 minutes) |
| 82 | stable | alable | stable |
| 83 | stable | stable | stable |
| 84 | stable | stable | stable |
| 85 | stable | unstable | unstable |
| 86 | stable | stable | stable |
| 87 | stable | stable | stable |
| 88 | stable | stable | some degraded |
| 89 | stable | stable | stable |
| 90 | stable | stable | stable |
| 91 | stable | stable | stable |
| 92 | stable | stable | stable |
| 93 | stable | stable | stable |
| 94 | stable | stable | stable |
| 95 | stable | stable | stable |
| 96 | stable | stable | stable |
| 97 | stable | stable | stable |
| 98 | stable | stable | some degraded |
| 99 | stable | stable | some degraded |

EXAMPLE 8

Freeze-thaw Cycle Test

Aqueous emulsion samples #3 (unhydrolyzed) and #58 (hydrolyzed) are used as examples for the test. The samples are frozen at −10° C. for about 18 hours then thawed at 25° C. Product viscosity is measured after the sample is completely thawed. The freeze-thaw cycle is repeated seven times. The results are shown below.

| Sample | At Start | After 7 Freeze-thaw cycles |
|---|---|---|
| #3 | Stable emulsion B.V. 405 cps | Phase-separatin occurred after one cycle. B.V. after 7 cycles is over 1600 cps. |
| #58 | Stable emulsion B.V. 200 cps. | Stable emulsion; no obvious difference after 7 cycles. B.V. 200 cps. |

EXAMPLE 9

Microscopic Evaluation

A number of aqueous emulsions are evaluated with a Zeiss Optical Microscope, phase contrast, 650X. The samples used are #2, #9, #47, #49, #50, #72, #74 and #75. In each of the samples evaluated, particles are see, evidencing the formation of an emulsion. The size of the particles vary depending on the surfactant system used. For example, Sample 2 has a larger average particle size (10–20 microns) whereas Sample 9 has a smaller average particle size (1–5 microns). Further, in the hydrolyzed samples, the particles tend to be less spherical. At a hydrolysis level of greater than 80%, the emulsion tends to invert, forming a solution. Despite this inversion, the solution retains its adhesive properties.

EXAMPLE 10

An amount of Sample #59 is used for the production of wallpaper. The wallpaper that is produced is a solid vinyl type, and the coater used is a Dahlgren reverse roll type. The following pasting conditions are used: oven temperature 150° C., paper speed 150 m/minute, transfer roller speed 750 rpm and coating weight 10 g/m².

An even coating is obtained with desired paste body and feel. The resulting pasted vinyl wallpaper then undergoes printing and hot embossing (about 165° C. web temperature) procedures. No problems are encountered when performing either procedure (e.g., no paste transfer, dusting or heat instability). The prepasted wallpaper is immersed in water for 10 seconds and applied to a wall. The paper hangs to wall very well, giving excellent wet and dry adhesion and the paper does not curl.

Having described the invention in detail and by reference to the preferred embodiments thereof, it will be apparent that modifications and variations are possible without departing from the scope of the appended claims.

What is claimed is:

1. A stable aqueous emulsion comprising:
   (1) between about 20 and about 50 weight percent synthetic polymer solids, said solids comprising a copolymer or a terpolymer derived from:
      (a) between about 60 and about 90 mole percent of a vinyl alcohol derived from a vinyl ester which has been partially or fully hydrolyzed and, optionally, said vinyl ester;
      (b) between about 10 and about 40 mole percent of one or more water soluble monomers; and
      (c) between about 0 and about 10 mole percent of any alkyl acrylate or alkyl methacrylate wherein alkyl represents an alkyl group containing between 1 and 20 carbon atoms;
   (2) between about 0.5 and about 5.0 weight percent of one or more surfactants or protective colloids; and
   (3) the balance water;
wherein said aqueous emulsion has a viscosity of less than 1000 cps at 25° C. and wherein said emulsion has adhesive properties.

2. The emulsion according to claim 1 wherein said vinyl ester of element (a) is vinyl acetate.

3. The emulsion according to claim 2 wherein said water soluble monomer of element (b) is selected from the group consisting of vinyl pyrrolidone, acrylic acid, sodium acrylate, itaconic acid, sodium methylene succinate, methacrylic acid, sodium methacrylate, 1-allyloxy-2-hydroxypropyl sulfonic acid, sodium 1-allyloxy-2-hydroxypropyl sulfonate, 2-acrylamido-2-methylpropyl sulfonic acid, sodium 2-acrylamido-2-methylpropyl sulfonate, dimethacrylamide, diacetoneacrylamide, N-vinyl formamide and acrylamide and mixtures thereof.

4. The emulsion according to claim 3 wherein element (b) comprises between about 20 and about 40 mole percent vinyl pyrrolidone and between about 0 and about 10 mole percent acrylamide based on the total amount of said polymer solids.

5. The emulsion according to claim 4 wherein element (b) comprises between about 20 and about 39 mole percent vinyl pyrrolidone and between about 0.1 and about 10 mole percent acrylamide based on the total amount of said polymer solids.

6. The emulsion according to claim 5 wherein said polymer solids comprise between about 70 and about 75 mole percent of vinyl alcohol derived from vinyl acetate which has been partially or fully hydrolyzed and, optionally, said vinyl acetate, between about 25 and about 30 mole percent vinyl pyrrolidone and between about 1 and about 5 mole percent 7. The emulsion according to claim 4 wherein said polymer solids comprise between about 75 and about 80 mole percent of vinyl alcohol derived from vinyl acetate which has been partially or fully hydrolyzed and, optionally, said vinyl acetate and between about 25 and about 30 mole percent vinyl pyrrolidone.

8. The emulsion according to claim 3 wherein element (c) comprises between about 0.1 and about 10 mole percent of an alkyl acrylate or alkyl methacrylate selected from the group consisting of ethyl acrylate, butyl acrylate, methyl methacrylate, methyl acrylate, ethylhexylacrylate, hydroxyethylacrylate, hydroxyethylmethacrylate, hydroxypropylacrylate, hydroxypropylmethacrylate, stearyl methacrylate and lauryl methacrylate and mixtures thereof based on the total amount of said polymer solids.

9. The emulsion according to claim 8 wherein element (b) comprises between about 20 and 39 mole percent vinyl pyrrolidone and element (c) comprises between about 0.1 and about 10 mole percent ethyl acrylate based on the total amount of said polymer solids.

10. The emulsion according to claim 9 wherein said polymer solids comprise between about 70 and about 75 mole percent of vinyl alcohol derived from vinyl acetate which has been partially or fully hydrolyzed and, optionally, said vinyl acetate, between about 25 and about 30 mole percent vinyl pyrrolidone, and between about 1 and about 5 mole percent ethyl acrylate.

11. The emulsion according to claim 2 wherein said one or more surfactants or protective colloids are present in an amount ranging from about 1 to about 5 weight percent of the emulsion.

12. The emulsion according to claim 11 wherein said one or more surfactants or protective colloids are selected from the group consisting of ammonium lauryl ether sulfate, sodium lauryl ether sulfate, octyl phenol ethoxylates (30–50 moles of ethylene oxide), nonyl phenol ethoxylates (30–50 moles of ethylene oxide), sodium lauryl sulfate, ammonium or sodium salts of poly(oxy-1,2-ethanediyl), $\alpha$-(nonylphenol)-$\omega$-hydroxy-phosphate, poly(oxy-1,2-ethanediyl), $\alpha$-phenol-$\omega$-hydroxy-phosphate and poly(oxy-1,2ethanediyl), $\alpha$-(octylphenol)-$\omega$-hydroxy-phosphate and mixtures thereof.

13. The emulsion according to claim 12 wherein said one or more surfactants or protective colloids comprises a mixture of about 2 weight percent ammonium lauryl ether sulfate and about one weight percent nonyl phenol ethoxylate.

14. The emulsion according to claim 3 further comprising one or more crosslinking agents present in an amount ranging from about 0.01 to about 3.0 weight percent of the emulsion.

15. The emulsion according to claim 14 wherein said one or more crosslinking agents is selected from the group consisting of ethylene glycol dimethacrylate, pentaerythritol tetracrylate, dipentaerythritol pentacrylate, trimethylolpropane trimethacrylate, pentaerythritol triacrylate, polyethylene glycol diacrylate, divinylbenzene, triallyl isocyanurate and mixtures thereof.

16. The emulsion according to claim 3 further comprising one or more antifoaming agents present in an amount ranging from about 0.01 to about 3.0 weight percent of the emulsion.

17. A method of using the emulsion of claim 1 as a wallcovering adhesive.

18. The emulsion according to claim 1 having a degree of hydrolysis ranging from about 30 percent to about 80 percent.

19. An emulsion copolymerization process for producing an aqueous emulsion having a polymer solids content by weight of about 20 to 50 percent and having adhesive properties and a viscosity of less than 1000 cps at 25° C. comprising copolymerization of
(a) between about 60 and about 90 mole percent of a vinyl ester;
(b) between about 10 and about 40 mole percent of one or more water soluble monomers; and
(c) between about 0 and about 10 mole percent of an alkyl acrylate or alkyl methacrylate wherein alkyl represents an alkyl group containing between 1 and 20 carbon atoms;

in an aqueous medium containing between about 0.5 and about 5.0 weight percent of one or more surfactants or protective colloids and then partially or fully hydrolyzing said vinyl ester to vinyl alcohol by the addition of acid or base.

20. The process according to claim 19 wherein said hydrolyzing step is accomplished by the addition of base.

* * * * *